United States Patent

Kimura et al.

[11] Patent Number: 4,726,654
[45] Date of Patent: Feb. 23, 1988

[54] MULTI-LAYERED ANTI-REFLECTION COATING

[75] Inventors: Kazuo Kimura, Sakai; Shizuyo Morikage, Kishiwada, both of Japan

[73] Assignee: Minolta Camera Kabushiki Kaisha, Osaka, Japan

[21] Appl. No.: 932,175

[22] Filed: Nov. 17, 1986

[30] Foreign Application Priority Data

Nov. 25, 1985 [JP] Japan ................ 60-265906

[51] Int. Cl.$^4$ ................................ G02B 1/10
[52] U.S. Cl. .............................. 350/164; 350/166
[58] Field of Search ....................... 350/164, 166

[56] References Cited

U.S. PATENT DOCUMENTS 3,738,732  6/1973  Ikeda ................... 350/164
3,960,441  6/1976  Kamiya et al. ........... 350/164

FOREIGN PATENT DOCUMENTS 52-76943  6/1977  Japan.
54-58037  5/1979  Japan.
56-55902  5/1981  Japan.

Primary Examiner—Bruce Y. Arnold
Attorney, Agent, or Firm—Price, Gess & Ubell

[57] ABSTRACT

A multi-layered anti-reflection coating is provided having six or seven layers. The design can be defined by the following parameters:

$N_1 < 1.5$    $N_1 d_1 = 0.25\lambda_0$
$N_2 > 1.8$    $0.11\lambda_0 < N_2 d_2 < 0.19\lambda_0$
$N_3 < 1.7$    $0.02\lambda_0 < N_3 d_3 < 0.08\lambda_0$
$N_4 > 1.8$    $0.12\lambda_0 < N_4 d_4 < 0.23\lambda_0$
$N_5 > 1.5$    $0.28\lambda_0 < N_5 d_5 < 0.36\lambda_0$
$N_6 < 1.5$    $0.04\lambda_0 < N_6 d_6 < 0.14\lambda_0$
$N_7 > 1.5$    $0 \leq N_7 d_7 < 0.55\lambda_0$
$N_4 > N_5 > N_6$ wherein N refers to the refractive index, d refers to the physical thickness with their respective subnumbers referring to the layer, with the first layer being the layer furthest from the substrate, and $\lambda_0$ refers to a preselected design wavelength.

9 Claims, 4 Drawing Figures

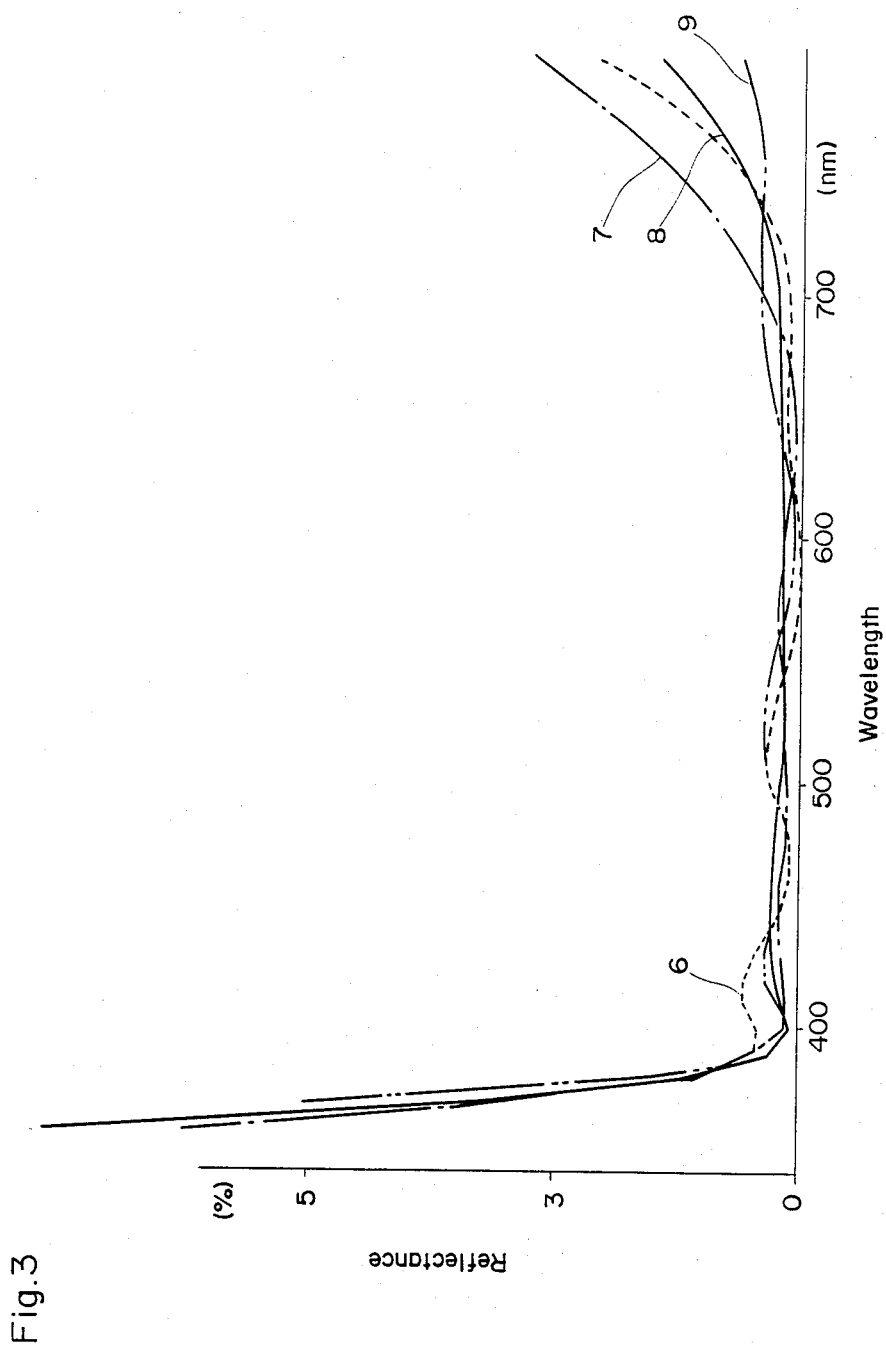

MULTI-LAYERED ANTI-REFLECTION COATING

BACKGROUND OF THE INVENTION

1. Field of the Invention

The present invention relates to a multi-layered anti-reflection coating to be applied to a substrate, and more particularly to an anti-reflection coating for use with a glass substrate to reduce the reflectance of light.

2. Description of the Prior Art

A considerable number of multi-layered anti-reflection coatings have been suggested in the prior art for a primary design purpose of ensuring that residual reflectance will be held to a relatively small value over the entire range of the visual spectrum. For example, multi-layered anti-reflection coatings having six or seven layers are suggested in Japanese Laid-Open patent application Nos. 56-55902, 52-76943, and 54-58037, and U.S. Pat. No. 3,960,441.

On the other hand, various types of automatic focus detecting device for cameras have been proposed recently in which a focusing condition of an objective lens is detected automatically. Here, a so-called active type automatic focusing condition detecting device is suitable for correctly detecting the focusing condition of the objective lens when the camera is directed to a dark object. The active type automatic focusing condition detecting device is constructed so that illuminating light is projected from the device side to a target object to be focused and the focusing condition is detected by receiving the light reflected by the target object.

Here, if such an active type automatic focusing condition detecting devices is mounted on a single lens reflex camera, it is desirable that the illuminating light be projected through the objective lens and that the light reflected on the target object be received by the light receiving means through the objective lens, in order to decrease the parallax between the objective lens and the optical system of the active type automatic focusing condition detecting device. Furthermore, a wavelength of the illuminating light should be selected within the infrared light range or near infrared light range, in order to avoid the blinking of the target person caused by stimulation by the illuminating light of the eyes of the target person. If the blinking of the target person can not be avoided, an undesirable photograph in which eyes of the target person are closed is taken.

However, the proposed conventional designs of multi-layered anti-reflection coatings as described above have sufficient anti-reflection effect with respect to the incident light having wavelengths within visible light range. Therefore, if the above active type automatic focusing condition detecting device is mounted on a camera when using an objective lens in which such conventional multi-layered anti-reflection coating is provided, most of illuminating light emitted behind the objective lens is reflected on one of the lens surfaces in the objective lens without illuminating the target object, or most of the light reflected from the target object is reflected on one of the lens surfaces in the objective lens without being incident on the light receiving means of the automatic focusing condition detecting device. Thus, it is difficult to correctly detect the focusing condition of the objective lens with respect to a target object positioned relatively far from the camera.

SUMMARY OF THE INVENTION

An object of the present invention is to provide an anti-reflection coating effective not only for visible light but also for the infrared light or for near infrared light.

The other object of the present invention is to provide an anti-reflection coating, effective for correctly detecting a focusing condition of an objective lens with respect to a target object positioned relatively far from the camera, when the above active type automatic focusing condition detecting device is mounted on a camera for detecting the focusing condition by using light passed through the objective lens.

In order to achieve the above described objects, an anti-reflection coating according to the present invention comprises at least six layers, the first layer furthest from the substrate having a refractive index $N_1$ and an optical thickness $N_1 d_1$, the second layer having a refractive index $N_2$ and an optical thickness $N_2 d_2$, the third layer having a refractive index $N_3$ and an optical thickness $N_3 d_3$, the fourth layer having a refractive index $N_4$ and an optical thickness $N_4 d_4$, the fifth layer having a refractive index $N_5$ and an optical thickness $N_5 d_5$, and the sixth layer having a refractive index $N_6$ and an optical thickness $N_6 d_6$, wherein the refractive indices and the optical thicknesses are related as follows with respect to a preselected design wavelength $\lambda_0$ selected within a wavelength range of 400 nanometers (nm) to 700 nanometers (nm):

| | |
|---|---|
| $N_1 < 1.5$ | $N_1 d_1 = 0.25\lambda_0$ |
| $N_2 > 1.8$ | $0.11\lambda_0 < N_2 d_2 < 0.19\lambda_0$ |
| $N_3 < 1.7$ | $0.02\lambda_0 < N_3 d_3 < 0.08\lambda_0$ |
| $N_4 > 1.8$ | $0.12\lambda_0 < N_4 d_4 < 0.23\lambda_0$ |
| $N_5 > 1.5$ | $0.28\lambda_0 < N_5 d_5 < 0.36\lambda_0$ |
| $N_6 < 1.5$ | $0.4\lambda_0 < N_6 d_6 < 0.14\lambda_0$ |
| $N_4 > N_5 > N_6$. | |

The features of the present invention which are believed to be novel are set forth with particularity in the appended claims. The present invention, both as to its organization and manner of operation, together with further objects and advantages thereof, may be best understood by reference to the following description, taken in conjunction with the accompanying drawings.

BRIEF DESCRIPTION OF THE DRAWINGS

FIG. 3 is a reflectance graph for the embodiments 6, 7, 8 and 9.

DETAILED DESCRIPTION OF THE PREFERRED EMBODIMENTS

The following specification, taken in conjunction with the drawings, set forth the preferred embodiments of the present invention in such a manner that any person skilled in the optical field can use the invention. The embodiments of the invention disclosed herein are the best modes contemplated by the inventors for carrying out their invention in a commercial environment, although it should be understood that various modifications can be accomplished within the parameters of the present invention.

Figure 1A:
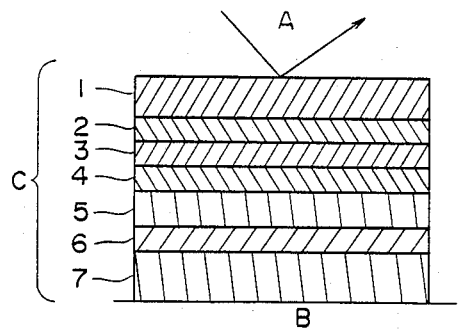
FIG. 1A is a schematic cross sectional view of anti-reflection coatings according to embodiments 1, 3, 4, 5, 6, 7, 8 and 9 of the present invention.
Figure 1B:
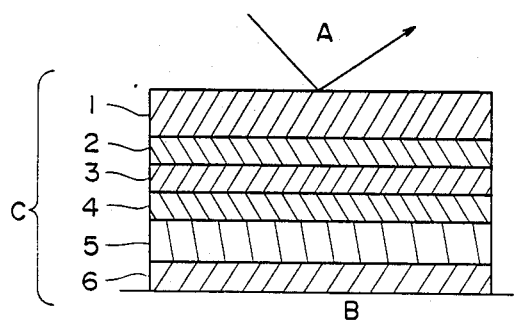
FIG. 1B is a schematic cross sectional view of an anti-reflection coating according to embodiment 2 of the present invention.

Referring to FIGS. 1A and 1B, schematic cross-sectional views of the structure of the anti-reflection coating of the present invention are disclosed. An anti-reflection coating C is applied to the surface of a substrate B such as a glass with the outermost layer being adjacent an air medium A. The anti-reflection coating C shown in FIG. 1A comprises at least six layers, a first layer 1 furthest from the substrate B, a second layer 2, a third layer 3, a fourth layer 4, a fifth layer 5, and a sixth layer 6, in sequence from the air side to the glass substrate side. Here it is possible to provide a seventh layer 7 as shown in FIG. 1B.

The first layer 1 is made of a material having a low refractive index less than 1.5, such as $MgF_2$, and is $0.25\lambda_0$ in optical thickness with respect to a design wavelength $\lambda_0$ selected within a wavelength range of 400 nanometers (nm) to 700 nanometers (nm). The second layer 2 is made of a material having a high refractive index over 1.8, such as a mixture of $ZrO_2$ and $TiO_2$, and is within a range of $0.11\lambda_0$ to $0.19\lambda_0$ in optical thickness. The third layer 3 is made of a material having a low refractive index less than 1.7, such as $MgF_2$, and is within a range of $0.02\lambda_0$ to $0.08\lambda_0$ in optical thickness. The fourth layer 4 is made of a material having a high refractive index over 1.8, such as a mixture of $ZrO_2$ and $TiO_2$, and is within a range of $0.12\lambda_0$ to $0.23\lambda_0$ in optical thickness. The fifth layer 5 is made of a material having a refractive index over 1.5, such as $Al_2O_3$, and is within a range of $0.28\lambda_0$ to $0.36\lambda_0$ in optical thickness. The sixth layer 6 is made of a material having a low refractive index less than 1.5, such as $MgF_2$, and is within a range of $0.04\lambda_0$ to $0.14\lambda_0$ in optical thickness. The seventh layer 7, if provided, is made of a material having a refractive index over 1.5, such as $Al_2O_3$, and is less than $0.55\lambda_0$ in optical thickness.

The optical thicknesses of respective layers are set to optimum values so that a sufficient anti-reflection effect may be obtained for a particular glass substrate B to be used in visible and infrared wavelength ranges, by applying a known method, for example, disclosed in U.S. Pat. No. 4,387,960.

Listed below are definite constructions of various embodiments according to the present invention, in which the design wavelength $\lambda_0$ is represented by 550 nanometers (nm).

In embodiments 1 to 9 listed in Tables 1 to 9 respectively, $MgF_2$ with a refractive index of 1.385 is used for the first, third and sixth layers 1, 3, 6, for its stable optical characteristics and its good resistance to humidity and physical scratches; a mixture of $ZrO_2$ and $TiO_2$ (refractive index of 2.10) is used for the second and fourth layers 2, 4, for its stable optical characteristics and its good resistance to the effects of humidity, and $Al_2O_3$ (refractive index of 1.62) is used for the fifth and seventh layers 5, 7 (the seventh layer is omitted in embodiment 2), for its good resistance to the effects of humidity and physical scratches, respectively. The optical thickness of each layer is set to an optimum value determined by the known method.

The anti-reflection coating is produced by evaporating $Al_2O_3$ for the seventh layer (excepting embodiment 2), $MgF_2$ for the sixth layer, $Al_2O_3$ for the fifth layer, a mixture of $ZrO_2$ and $TiO_2$ for the fourth layer, $MgF_2$ for the third layer, a mixture of $ZrO_2$ and $TiO_2$ for the second layer, and $MgF_2$ for the first layer in that order on the surface of the preselected glass substrate.

Here, in all of the Tables 1 to 9, the optical thickness of the first layer is not represented by $0.25\lambda_0$. However, if the design wavelength $\lambda_0$ is selected for satisfying $N_1d_1=0.25\lambda_0$, all of the optical thicknesses of the other layers satisfy the above ranges of optical thicknesses, respectively.

Figure 2:
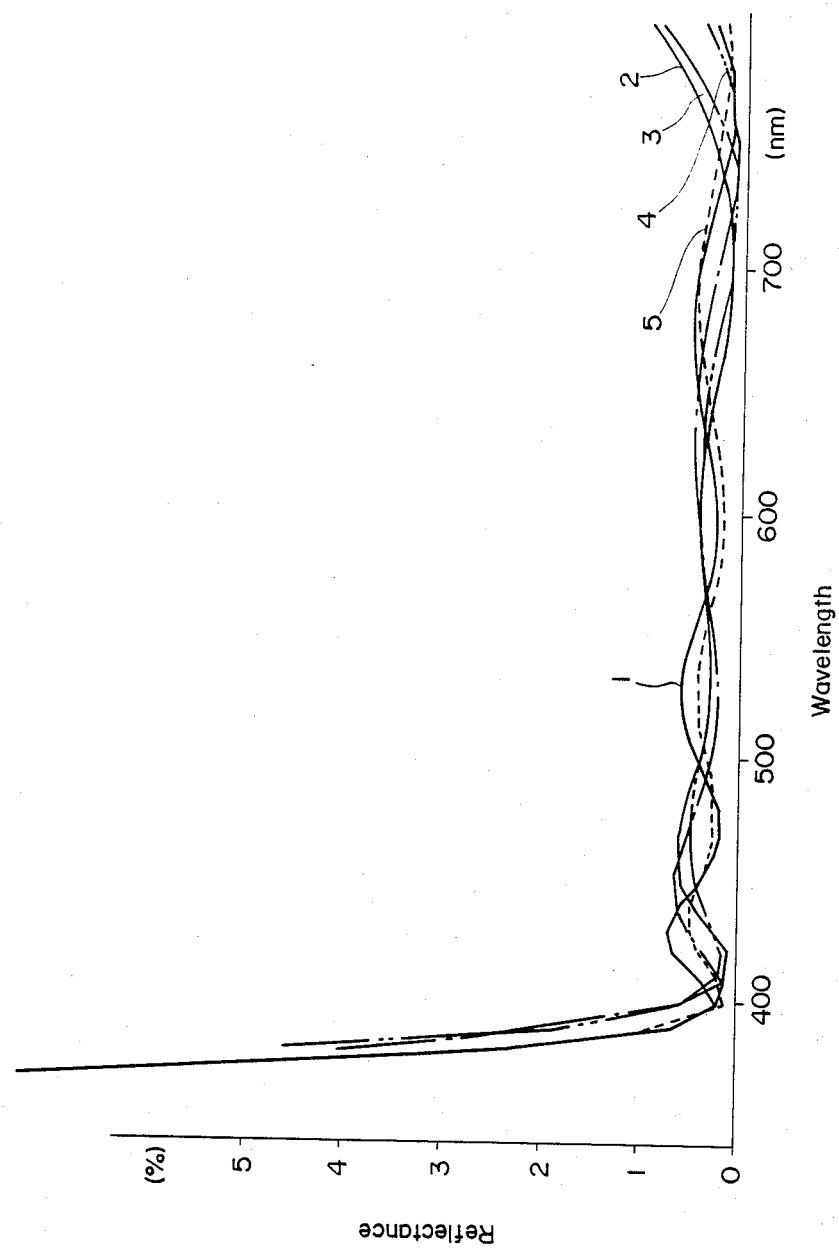
FIG. 2 is a reflectance graph for the embodiments 1, 2, 3, 4 and 5.

FIG. 2 shows the percent of reflectance versus wavelength curves for embodiments 1 to 5 listed in Tables 1 to 5 respectively. Curves 1 to 5 in FIG. 2 indicate the spectral reflectance characteristics of embodiments 1 to 5, respectively. As is clear from FIG. 2, by adjusting only the optical thicknesses of respective layers whose material is preselected above, an anti-reflection coating having a broad anti-reflection spectral range of 400 nanometers to 800 nanometers and minimized residual reflectance less than about 1% is obtainable for any one of a number of glass substrates whose refractive indices widely vary.

Embodiments 6 to 9 listed in Tables 6 to 9 respectively are designed for obtaining a sufficient anti-reflection effect within a visible wavelength range of 400 nanometers to 700 nanometers. FIG. 3 shows the percent of reflectance versus wavelength curves for embodiments 6 to 9 listed in Tables 6 to 9 respectively. Curves 6 to 9 in FIG. 3 indicate the spectral reflectance characteristics of embodiments 6 to 9, respectively. As is clear from FIG. 3, by adjusting only the optical thicknesses of respective layers whose material is preselected above, an anti-reflection coating having a broad anti-reflection spectral range of 400 nanometers to 700 nanometers and minimized residual reflectance less than about 0.6% is obtainable for any one of a number of glass substrate whose refractive indices widely vary.

Furthermore, the anti-reflection coatings of the present embodiments are composed of optically stable and highly durable materials for the respective layers, whereby the coatings is optically stable, easy to produce, and durable as a whole.

While the preferred embodiments have been disclosed in an enabling manner to facilitate the reproduction of the present invention, it should be realized that various modifications can be easily accomplished by a person skilled in this field, and, accordingly, the present invention should be measured solely from the appending claims.

TABLE 1

EMBODIMENT 1

|  | Material | Refractive index | Optical thickness |
|---|---|---|---|
| first layer | $MgF_2$ | 1.385 | $0.274 \lambda_0$ |
| second layer | Mixture of $ZrO_2$ and $TiO_2$ | 2.100 | $0.153 \lambda_0$ |
| third layer | $MgF_2$ | 1.385 | $0.060 \lambda_0$ |
| fourth layer | Mixture of $ZrO_2$ and $TiO_2$ | 2.100 | $0.172 \lambda_0$ |
| fifth layer | $Al_2O_3$ | 1.62 | $0.350 \lambda_0$ |
| sixth layer | $MgF_2$ | 1.385 | $0.086 \lambda_0$ |
| seventh layer | $Al_2O_3$ | 1.62 | $0.548 \lambda_0$ |
| substrate | glass | 1.5 |  |

($\lambda_0$ = 550 nm)

TABLE 2

EMBODIMENT 2

| | Material | Refractive index | Optical thickness |
|---|---|---|---|
| first layer | MgF$_2$ | 1.385 | 0.280 $\lambda_0$ |
| second layer | Mixture of ZrO$_2$ and TiO$_2$ | 2.100 | 0.142 $\lambda_0$ |
| third layer | MgF$_2$ | 1.385 | 0.071 $\lambda_0$ |
| fourth layer | Mixture of ZrO$_2$ and TiO$_2$ | 2.100 | 0.147 $\lambda_0$ |
| fifth layer | Al$_2$O$_3$ | 1.62 | 0.376 $\lambda_0$ |
| sixth layer | MgF$_2$ | 1.385 | 0.059 $\lambda_0$ |
| substrate | glass | 1.6 | |

($\lambda_0$ = 550 nm)

TABLE 3

EMBODIMENT 3

| | Material | Refractive index | Optical thickness |
|---|---|---|---|
| first layer | MgF$_2$ | 1.385 | 0.280 $\lambda_0$ |
| second layer | Mixture of ZrO$_2$ and TiO$_2$ | 2.100 | 0.142 $\lambda_0$ |
| third layer | MgF$_2$ | 1.385 | 0.071 $\lambda_0$ |
| fourth layer | Mixture of ZrO$_2$ and TiO$_2$ | 2.100 | 0.147 $\lambda_0$ |
| fifth layer | Al$_2$O$_3$ | 1.62 | 0.376 $\lambda_0$ |
| sixth layer | MgF$_2$ | 1.385 | 0.059 $\lambda_0$ |
| seventh layer | Al$_2$O$_3$ | 1.62 | 0.504 $\lambda_0$ |
| substrate | glass | 1.6 | |

($\lambda_0$ = 550 nm)

TABLE 4

EMBODIMENT 4

| | Material | Refractive index | Optical thickness |
|---|---|---|---|
| first layer | MgF$_2$ | 1.385 | 0.270 $\lambda_0$ |
| second layer | Mixture of ZrO$_2$ and TiO$_2$ | 2.100 | 0.161 $\lambda_0$ |
| third layer | MgF$_2$ | 1.385 | 0.049 $\lambda_0$ |
| fourth layer | Mixture of ZrO$_2$ and TiO$_2$ | 2.100 | 0.191 $\lambda_0$ |
| fifth layer | Al$_2$O$_3$ | 1.62 | 0.333 $\lambda_0$ |
| sixth layer | MgF$_2$ | 1.385 | 0.102 $\lambda_0$ |
| seventh layer | Al$_2$O$_3$ | 1.62 | 0.289 $\lambda_0$ |
| substrate | glass | 1.7 | |

($\lambda_0$ = 550 nm)

TABLE 5

EMBODIMENT 5

| | Material | Refractive index | Optical thickness |
|---|---|---|---|
| first layer | MgF$_2$ | 1.385 | 0.265 $\lambda_0$ |
| second layer | Mixture of ZrO$_2$ and TiO$_2$ | 2.100 | 0.167 $\lambda_0$ |
| third layer | MgF$_2$ | 1.385 | 0.040 $\lambda_0$ |
| fourth layer | Mixture of ZrO$_2$ and TiO$_2$ | 2.100 | 0.211 $\lambda_0$ |
| fifth layer | Al$_2$O$_3$ | 1.62 | 0.321 $\lambda_0$ |
| sixth layer | MgF$_2$ | 1.385 | 0.119 $\lambda_0$ |
| seventh layer | Al$_2$O$_3$ | 1.62 | 0.289 $\lambda_0$ |
| substrate | glass | 1.8 | |

($\lambda_0$ = 550 nm)

TABLE 6

EMBODIMENT 6

| | Material | Refractive index | Optical thickness |
|---|---|---|---|
| first layer | MgF$_2$ | 1.385 | 0.246 $\lambda_0$ |
| second layer | Mixture of ZrO$_2$ and TiO$_2$ | 2.100 | 0.179 $\lambda_0$ |
| third layer | MgF$_2$ | 1.385 | 0.034 $\lambda_0$ |
| fourth layer | Mixture of ZrO$_2$ and TiO$_2$ | 2.100 | 0.191 $\lambda_0$ |
| fifth layer | Al$_2$O$_3$ | 1.62 | 0.329 $\lambda_0$ |
| sixth layer | MgF$_2$ | 1.385 | 0.070 $\lambda_0$ |
| seventh layer | Al$_2$O$_3$ | 1.62 | 0.532 $\lambda_0$ |
| substrate | glass | 1.5 | |

($\lambda_0$ = 550 nm)

TABLE 7

EMBODIMENT 7

| | Material | Refractive index | Optical thickness |
|---|---|---|---|
| first layer | MgF$_2$ | 1.385 | 0.255 $\lambda_0$ |
| second layer | Mixture of ZrO$_2$ and TiO$_2$ | 2.100 | 0.162 $\lambda_0$ |
| third layer | MgF$_2$ | 1.385 | 0.051 $\lambda_0$ |
| fourth layer | Mixture of ZrO$_2$ and TiO$_2$ | 2.100 | 0.160 $\lambda_0$ |
| fifth layer | Al$_2$O$_3$ | 1.62 | 0.346 $\lambda_0$ |
| sixth layer | MgF$_2$ | 1.385 | 0.053 $\lambda_0$ |
| seventh layer | Al$_2$O$_3$ | 1.62 | 0.504 $\lambda_0$ |
| substrate | glass | 1.6 | |

($\lambda_0$ = 550 nm)

TABLE 8

EMBODIMENT 8

| | Material | Refractive index | Optical thickness |
|---|---|---|---|
| first layer | MgF$_2$ | 1.385 | 0.254 $\lambda_0$ |
| second layer | Mixture of ZrO$_2$ and TiO$_2$ | 2.100 | 0.168 $\lambda_0$ |
| third layer | MgF$_2$ | 1.385 | 0.041 $\lambda_0$ |
| fourth layer | Mixture of ZrO$_2$ and TiO$_2$ | 2.100 | 0.187 $\lambda_0$ |
| fifth layer | Al$_2$O$_3$ | 1.62 | 0.328 $\lambda_0$ |
| sixth layer | MgF$_2$ | 1.385 | 0.093 $\lambda_0$ |
| seventh layer | Al$_2$O$_3$ | 1.62 | 0.291 $\lambda_0$ |
| substrate | glass | 1.7 | |

($\lambda_0$ = 550 nm)

TABLE 9

EMBODIMENT 9

| | Material | Refractive index | Optical thickness |
|---|---|---|---|
| first layer | MgF$_2$ | 1.385 | 0.255 $\lambda_0$ |
| second layer | Mixture of ZrO$_2$ and TiO$_2$ | 2.100 | 0.173 $\lambda_0$ |
| third layer | MgF$_2$ | 1.385 | 0.033 $\lambda_0$ |
| fourth layer | Mixture of ZrO$_2$ and TiO$_2$ | 2.100 | 0.215 $\lambda_0$ |
| fifth layer | Al$_2$O$_3$ | 1.62 | 0.313 $\lambda_0$ |
| sixth layer | MgF$_2$ | 1.385 | 0.120 $\lambda_0$ |
| seventh layer | Al$_2$O$_3$ | 1.62 | 0.291 $\lambda_0$ |
| substrate | glass | 1.8 | |

($\lambda_0$ = 550 nm)

What is claimed is:

1. A multi-layered anti-reflection coating for use with a glass substrate to reduce reflectance of light comprising at least six layers, the first layer furthest from the substrate composed of MgF$_2$, the second layer composed of a mixture of ZrO$_2$ and TiO$_2$, the third layer composed of MgF$_2$, the fourth layer composed of a mixture of ZrO$_2$ and TiO$_2$, the fifth layer composed of Al$_2$O$_3$, and the sixth layer composed of MgF$_2$.

2. A multi-layered anti-reflection coating as claimed in claim 1, wherein the refractive indices and the optical thicknesses of the first to sixth layers are related as follows with respect to a design wavelength $\lambda_0$ selected within a range of 400 nanometers (nm) to 700 nanometers (nm):

| | |
|---|---|
| $N_2 < 1.5$ | $N_1 d_1 = 0.25\lambda_0$ |
| $N_2 > 1.8$ | $0.11\lambda_0 < N_2 d_2 < 0.19\lambda_0$ |
| $N_3 < 1.7$ | $0.02\lambda_0 < N_3 d_3 < 0.08\lambda_0$ |
| $N_4 > 1.8$ | $0.12\lambda_0 < N_4 d_4 < 0.23\lambda_0$ |
| $N_5 > 1.5$ | $0.28\lambda_0 < N_5 d_5 < 0.36\lambda_0$ |
| $N_6 < 1.5$ | $0.04\lambda_0 < N_6 d_6 < 0.14\lambda_0$ |

$N_4 > N_5 > N_6$ wherein Ni refers to the index of refraction, Nidi refers to the optical thickness and the subnumber i refers to the i-th layer.

3. A multi-layered anti-reflection coating as claimed in claim 2, further comprising the seventh layer, composed of $Al_2O_3$, having a refractive index $N_7$ and an optical thickness $N_7 d_7$ related as follows:

$N_7 > 1.5$  $\quad 0 < N_7 d_7 < 0.55\lambda_0.$

4. A multi-layered anti-reflection coating for use with a glass substrate to reduce reflectance of light comprising at least six layers, the first layer furthest from the substrate having a refractive index $N_1$ and an optical thickness $N_1 d_1$, the second layer having a refractive index $N_2$ and an optical thickness $N_2 d_2$, the third layer having a refractive index $N_3$ and an optical thickness $N_3 d_3$, the fourth layer having a refractive index $N_4$ and an optical thickness $N_4 d_4$, the fifth layer having a refractive index $N_5$ and an optical thickness $N_5 d_5$, and the sixth layer having a refractive index $N_6$ and an optical thickness $N_6 d_6$, wherein the refractive indices and the optical thicknesses are related as follows with respect to a preselected design wavelength $\lambda_0$ selected within a wavelength range of 400 nanometers (nm) to 700 nanometers (nm):

| | |
|---|---|
| $N_1 < 1.5$ | $N_1 d_1 = 0.25\lambda_0$ |
| $N_2 > 1.8$ | $0.11\lambda_0 < N_2 d_2 < 0.19\lambda_0$ |
| $N_3 < 1.7$ | $0.02\lambda_0 < N_3 d_3 < 0.80\lambda_0$ |
| $N_4 > 1.8$ | $0.12\lambda_0 < N_4 d_4 < 0.23\lambda_0$ |
| $N_5 > 1.5$ | $0.28\lambda_0 < N_5 d_5 < 0.36\lambda_0$ |
| $N_6 < 1.5$ | $0.04\lambda_0 < N_6 d_6 < 0.14\lambda_0$ |

$N_4 > N_5 > N_6.$

5. A multi-layered anti-reflection coating as claimed in claim 4, further comprising a seventh layer, having a refractive index $N_7$ and an optical thickness $N_7 d_7$, provided between the sixth layer and the substrate and wherein the refractive index and the optical thickness of the seventh layer are related as follows:

$N_7 > 1.5$  $\quad 0 \leq N_7 d_7 < 0.55\lambda_0.$

6. A multi-layered anti-reflection coating as claimed in claim 5, wherein the first layer, the third layer and the sixth layer are made of $MgF_2$.

7. A multi-layered anti-reflection coating as claimed in claim 6, wherein the fifth layer and the seventh later are made of $Al_2O_3$.

8. A multi-layered anti-reflection coating as claimed in claim 7, wherein the second layer and the fourth layer are made of a mixture of $ZrO_2$ and $TiO_2$.

9. A multi-layered anti-reflection coating for use with a glass substrate to reduce reflectance of light comprising seven layers, the first layer furthest from the substrate having a refractive index $N_1$ and an optical thickness $N_1 d_1$, the second layer having a refractive index $N_2$ and an optical thickness $N_2 d_2$, the third layer having a refractive index $N_3$ and an optical thickness $N_3 d_3$, the fourth layer having a refractive index $N_4$ and an optical thickness $N_4 d_4$, the fifth layer having a refractive index $N_5$ and an optical thickness $N_5 d_5$, the sixth layer having a refractive index $N_6$ and an optical thickness $N_6 d_6$, and the seventh layer having a refractive index $N_7$ and an optical thickness $N_7 d_7$, wherein the refractive indices and the optical thicknesses are related as follows with respect to a preselected design wavelength $\lambda_0$ selected within a wavelength range of 400 nanometers (nm) to 700 nanometers (nm):

| | |
|---|---|
| $N_5 < 1.5$ | $N_1 d_1 = 0.25\lambda_0$ |
| $N_2 > 1.8$ | $0.11\lambda_0 < N_2 d_2 < 0.19\lambda_0$ |
| $N_3 < 1.7$ | $0.02\lambda_0 < N_3 d_3 < 0.08\lambda_0$ |
| $N_4 > 1.8$ | $0.12\lambda_0 < N_4 d_4 < 0.23\lambda_0$ |
| $N_5 > 1.5$ | $0.28\lambda_0 < N_5 d_5 < 0.36\lambda_0$ |
| $N_6 < 1.5$ | $0.04\lambda_0 < N_6 d_6 < 0.14\lambda_0$ |
| $N_7 > 1.5$ | $0 < N_7 d_7 < 0.55\lambda_0$ |

$N_4 > N_5 > N_6.$

* * * * *